(12) United States Patent
Duffy, IV et al.

(10) Patent No.: US 8,086,755 B2
(45) Date of Patent: Dec. 27, 2011

(54) DISTRIBUTED MULTICAST SYSTEM AND METHOD IN A NETWORK

(75) Inventors: Edward T. Duffy, IV, Arlington, MA (US); Scott M. Geng, Westborough, MA (US); Hai Huang, Nashua, NH (US); Hua Qin, Marlboro, MA (US)

(73) Assignee: Egenera, Inc., Boxborough, MA (US)

( * ) Notice: Subject to any disclaimer, the term of this patent is extended or adjusted under 35 U.S.C. 154(b) by 936 days.

(21) Appl. No.: 10/999,118

(22) Filed: Nov. 29, 2004

(65) Prior Publication Data

US 2006/0114903 A1    Jun. 1, 2006

(51) Int. Cl.
*G06F 15/173*    (2006.01)
*G06F 15/16*    (2006.01)
*H04L 12/28*    (2006.01)

(52) U.S. Cl. ........ 709/238; 709/201; 709/217; 709/218; 709/227; 709/228; 709/229; 709/231; 709/232; 709/239; 709/240; 709/241; 709/242; 709/246; 709/247; 709/248; 709/251; 709/252; 709/253; 370/389; 370/390; 370/391; 370/392; 370/393; 370/394; 370/396; 370/397; 370/398; 370/399; 370/431; 370/432; 370/464; 370/489; 370/901; 370/902; 370/908; 370/909; 370/912

(58) Field of Classification Search .................. 709/201, 709/217–218, 227–229, 231–232, 238–242, 709/246–248, 251–253; 370/389–394, 396–399, 370/431–432, 464, 489, 901, 902, 908–909, 370/912

See application file for complete search history.

(56) References Cited

U.S. PATENT DOCUMENTS

| | | | |
|---|---|---|---|
| 6,614,787 B1 * | 9/2003 | Jain et al. | 370/390 |
| 6,912,589 B1 * | 6/2005 | Jain et al. | 709/238 |
| 6,944,786 B2 * | 9/2005 | Kashyap | 714/4 |
| 7,031,304 B1 * | 4/2006 | Arberg et al. | 370/360 |
| 7,031,341 B2 * | 4/2006 | Yu | 370/469 |
| 7,080,157 B2 * | 7/2006 | McCanne | 709/238 |
| 7,283,465 B2 * | 10/2007 | Zelig et al. | 370/219 |
| 7,301,946 B2 * | 11/2007 | Meier et al. | 370/390 |
| 7,324,513 B2 * | 1/2008 | Shankar et al. | 370/390 |
| 7,339,915 B2 * | 3/2008 | Jakkahalli et al. | 370/338 |
| 7,339,929 B2 * | 3/2008 | Zelig et al. | 370/390 |
| 7,369,551 B2 * | 5/2008 | He et al. | 370/389 |
| 7,382,781 B1 * | 6/2008 | Sridhar et al. | 370/395.21 |
| 7,389,359 B2 * | 6/2008 | Jain et al. | 709/238 |
| 2003/0023896 A1 * | 1/2003 | Kashyap | 714/5 |
| 2003/0174706 A1 * | 9/2003 | Shankar et al. | 370/393 |
| 2003/0174725 A1 * | 9/2003 | Shankar | 370/428 |
| 2004/0037279 A1 * | 2/2004 | Zelig et al. | 370/390 |
| 2004/0133619 A1 * | 7/2004 | Zelig et al. | 709/200 |
| 2004/0221042 A1 * | 11/2004 | Meier | 709/227 |
| 2005/0025160 A1 * | 2/2005 | Meier et al. | 370/395.53 |
| 2005/0111453 A1 * | 5/2005 | Mizutani | 370/390 |
| 2005/0163115 A1 * | 7/2005 | Dontu et al. | 370/389 |
| 2006/0109802 A1 * | 5/2006 | Zelig et al. | 370/258 |

* cited by examiner

FOREIGN PATENT DOCUMENTS

| | | |
|---|---|---|
| WO | WO-01/65767 A | 9/2001 |
| WO | WO-02/21301 A | 3/2002 |
| WO | WO-02/086712 A | 10/2002 |

*Primary Examiner* — John Follansbee
*Assistant Examiner* — Saket K Daftuar
(74) *Attorney, Agent, or Firm* — Chapin IP Law, LLC; Barry W. Chapin, Esq.

(57) ABSTRACT

The invention provides multicast communication using distributed topologies in a network. The control nodes in the network build a distributed topology of processor nodes for providing multicast packet distribution. Multiple processor nodes in the network participate in the decisions regarding the forwarding of multicast packets as opposed to multicast communications being centralized in the control nodes.

39 Claims, 11 Drawing Sheets

DISTRIBUTED MULTICAST SYSTEM AND METHOD IN A NETWORK

TECHNICAL FIELD

This invention relates generally to emulating multicast functionality in communication networks.

BACKGROUND

Multicast functionality delivers a packet of network data to ideally all recipients registered in a multicast group. More specifically, a group of receivers register an interest in receiving a particular data stream. This group does not have any physical or geographical boundaries, i.e., the receivers can be located anywhere on the network.

Multicast functionality can be directly supported by the network infrastructure or it may be emulated. For example, in the BladeFrame product by Egenera the multicast functionality is emulated.

In the BladeFrame platform architecture, the communication mechanism is point-to-point and provided in a virtual interface (VI)-modeled switched Giganet fabric. Multicast functionality is emulated using a control node to distribute multicast packets to processor nodes. A single multicast packet is received by the control node which then sends the packet to each processor node in the multicast group.

The BladeFrame platform includes a set of processing nodes connected to the switch fabric via high speed interconnects. The switch fabric is connected to at least one control node that is in communication with an external internet protocol (IP) network or other data communication networks. Processing nodes, control nodes, and at least two switch fabrics are interconnected with a fixed, pre-wired mesh of point-to-point links.

As shown in FIG. 1, an embodiment of a BladeFrame hardware platform 100 includes a set of processing nodes 105a-n connected to a switch fabrics 115a,b via high-speed, interconnect 110a,b. The switch fabric 115a,b is also connected to at least one control node 120a,b that is in communication with an external IP network 125 (or other data communication networks), and with a storage area network (SAN) 130. A management application 135, for example, executing remotely, may access one or more of the control nodes via the IP network 125 to assist in configuring the platform 100 and deploying virtualized processing area networks (PANs).

In certain embodiments, about 24 processing nodes 105a-n, two control nodes 120, and two switch fabrics 115 a,b are contained in a single chassis and interconnected with a fixed, pre-wired mesh of point-to-point (PtP) links. Each processing node 105 is a board that includes one or more (for example, four) processors 106j-l, one or more network interface cards (NICs) 107, and local memory (for example, greater than 4 Gbytes) that, among other things, includes some BIOS firmware for booting and initialization. There is no local disk for the processors 106; instead all storage, including storage needed for paging, is handled by SAN storage devices 130.

Each control node 120 is a single board that includes one or more (for example, four) processors, local memory, and local disk storage for holding independent copies of the boot image and initial file system that is used to boot operating system software for the processing nodes 105 and for the Central Processing Units 106 on the processing nodes. Each control node communicates with SAN 130 via 100 megabyte/second fibre channel adapter cards 128 connected to fiber channel links 122, 124 and communicates with the Internet (or any other external network) 125 via an external network interface 129 having one or more gigabit Ethernet NICs connected to gigabit Ethernet links 121,123. (Many other techniques and hardware may be used for SAN and external network connectivity.) Each control node includes a low speed Ethernet port (not shown) as a dedicated management port, which may be used instead of remote, web-based management via management application 135.

The switch fabrics are composed of one or more 30-port Giganet switches 115, such as the NIC-CLAN 1000 (collapsed LAN) and Clan 5300 switch, and the various processing and control nodes use corresponding NICs for communication with such a fabric module. Giganet switch fabrics have the semantics of a Non-Broadcast Multiple Access (NBMA) network. All inter-node communication is via a switch fabric. Each link is formed as a serial connection between a NIC 107 and a port in the switch fabric 115. Each link operates at 112 megabytes/second.

Under software control, the platform supports multiple, simultaneous and independent processing areas networks (PANs). Each PAN, through software commands, is configured to have a corresponding subset of processors that may communicate via a virtual local area network that is emulated over the point-to-point mesh.

Certain embodiments allow an administrator to build virtual, emulated LANs using virtual components, interfaces, and connections. Each of the virtual LANs can be internal and private to the platform 100, or multiple processors may be formed into a processor cluster externally visible as a single IP address.

In certain embodiments, the virtual networks so created emulate a switched Ethernet network, though the physical, underlying network is a PtP mesh. The virtual network utilizes IEEE MAC addresses, and the processing nodes support address resolution protocols, for example, IETF ARP processing to identify and associate IP addresses with MAC addresses. Consequently, a given processor node replies to an ARP request consistently whether the ARP request came from a node internal or external to the platform.

The control node-side networking logic maintains data structures that contain information reflecting the connectivity of the LAN (for example, which nodes may communicate to which other nodes). The control node logic also allocates and assigns virtual interface or reliable virtual interface (VI) (or RVI) mappings to the defined MAC addresses and allocates and assigns VIs or (RVIs) between the control nodes and between the control nodes and the processing nodes.

As each processor boots, BIOS-based boot logic initializes each processor 106 of the node 105 and, among other things, establishes a (or discovers the) VI to the control node logic. The processor node then obtains from the control node relevant data link information, such as the processor node's MAC address, and the MAC identities of other devices within the same data link configuration. Each processor then registers its IP address with the control node, which then binds the IP address to the node and an RVI (for example, the RVI on which the registration arrived). In this fashion, the control node will be able to bind IP addresses for each virtual MAC for each node on a subnet. In addition to the above, the processor node also obtains the RVI or VI-related information for its connections to other nodes or to control node networking logic.

Thus, after boot and initialization, the various processor nodes should understand their Layer 2, data link connectivity. As will be explained below, Layer 3 (IP) connectivity and specifically Layer 3 to Layer 2 associations are determined during normal processing of the processors as a consequence of the address resolution protocol.

FIG. 2A details the processor-side networking logic 210 and FIG. 2B details the control node-side networking 310 logic of certain embodiments. The processor side logic 210 includes IP stack 305, virtual network driver 310, ARP logic 350, RCLAN layer 315, and redundant Giganet drivers 320a, b. The control node-side logic 310 includes redundant Giganet drivers 325a,b, RCLAN layer 330, virtual Cluster proxy logic 360, virtual LAN server 335, ARP server logic 355, virtual LAN proxy 340, and physical LAN drivers 345.

The IP stack 305 is the communication protocol stack provided with the operating system (e.g., Linux) used by the processing nodes 105. The IP stack provides a Layer 3 interface for the applications and operating system executing on a processor 106 to communicate with the simulated Ethernet network. The IP stack provides packets of information to the virtual Ethernet layer 310 in conjunction with providing a Layer 3, IP address as a destination for that packet. The IP stack logic is conventional except that certain embodiments avoid check sum calculations and logic.

The virtual Ethernet driver 310 will appear to the IP stack 305 like a "real" Ethernet driver. In this regard, the virtual Ethernet driver 310 receives IP packets or datagrams from the IP stack for subsequent transmission on the network, and it receives packet information from the network to be delivered to the stack as an IP packet.

The stack builds the MAC header. The "normal" Ethernet code in the stack may be used. The virtual Ethernet driver receives the packet with the MAC header already built and the correct MAC address already in the header.

For any multicast or broadcast type messages, the virtual Ethernet driver 310 sends the message to the control node on a defined VI. The control node then clones the packet and sends it to all nodes (excluding the sending node) and the uplink accordingly. Further details regarding the virtual Ethernet driver, the RCLAN layer, the virtual interfaces, and generally the processor-side networking logic are described in International Publication Number WO 02/086712, published on 31 Oct. 2002, entitled "Virtual Networking System and Method in a Processing System" the entire teachings of which are herein incorporated by reference.

On the control-node-side networking logic, the virtual LAN server logic 335 facilitates the emulation of an Ethernet network over the underlying NBMA network. The virtual LAN server logic manages membership to a corresponding virtual LAN; provides RVI mapping and management; ARP processing and IP mapping to RVI; provides broadcast and multicast services; facilitates bridging and routing to other domains; and manages service clusters.

Administrators configure the virtual LANs using management application 135. Assignment and configuration of IP addresses on virtual LANs may be done in the same way as on an "ordinary" subnet. The choice of IP addresses to use is dependent on the external visibility of nodes on a virtual LAN. If the virtual LAN is not globally visible (either not visible outside the platform 100, or from the Internet), private IP addresses should be used. Otherwise, IP addresses must be configured from the range provided by the internet service provider (ISP) that provides the Internet connectivity. In general, virtual LAN IP address assignment must be treated the same as normal LAN IP address assignment. Configuration files stored on the local disks of the control node 120 define the IP addresses within a virtual LAN. For the purposes of a virtual network interface, an IP alias just creates another IP to RVI mapping on the virtual LAN server logic 335. Each processor may configure multiple virtual interfaces as needed. The primary restrictions on the creation and configuration of virtual network interfaces are IP address allocation and configuration.

Each virtual LAN server 335 is configured to manage exactly one broadcast domain, and any number of Layer 3 (IP) subnets may be present on the given Layer 2 broadcast domain. The servers 335 are configured and created in response to administrator commands to create virtual LANs.

With regard to processor connections, as nodes register with the virtual LAN server 335, the virtual LAN server creates and assigns virtual MAC addresses for the nodes, as described above. In conjunction with this, the virtual LAN server logic maintains data structures reflecting the topology and MAC assignments for the various nodes. The virtual LAN server logic then creates corresponding RVIs for the unicast paths between nodes. These RVIs are subsequently allocated and made known to the nodes during the nodes booting. Moreover, the RVIs are also associated with IP addresses during the virtual LAN server's handling of ARP traffic. The RVI connections are torn down if a node is removed from the topology.

With respect to broadcast and multicast services, broadcasts are handled by receiving the packet on a dedicated RVI. The packet is then cloned by the server 335 and unicast to all virtual interfaces 310 in the relevant broadcast domain.

The same approach is used for multicast. All multicast packets will be reflected off the virtual LAN server. Under some alternative embodiments, the virtual LAN server will treat multicast the same as broadcast and rely on IP filtering on each node to filter out unwanted packets.

When an application wishes to send or receive multicast addresses it must first join a multicast group. When a process on a processor performs a multicast join, the processor virtual network driver 310 sends a join request to the virtual LAN server 335 via a dedicated RVI. The virtual LAN server then configures a specific multicast MAC address on the interface and informs the LAN Proxy 340 as necessary. The Proxy 340 will have to keep track of use counts on specific multicast groups so a multicast address is only removed when no processor belongs to that multicast group.

The BladeFrame architecture uses the control node for multicast functionality as illustrated in FIG. 3. Multicast packets, whether they originate from an external source or a processor node, are processed by the control node 412. The control node 412 replicates the multicast packet and forwards the multicast packet to each processor node 414a . . . n. All multicast emulation is centralized in the control nodes.

Recipients that are interested in receiving data flowing to a particular multicast group join the group using Internet Group Management Protocol (IGMP). The control node 412 keeps track of processor node 414a . . . n multicast group membership using IGMP snooping of Layer 2 function which is a method to deal with multicast in a Layer 2 switching environment. For every multicast packet received, the control node iterates over the list of processor nodes according to the multicast membership information and transmits the packet to each member processor node. As such, because all multicast processing is in the control node scalability issues arise in certain contexts.

SUMMARY OF THE INVENTION

The invention provides multicast communication using distributed topologies in a network. Multiple processor nodes in the network participate in the decisions regarding the forwarding of multicast packets as opposed to multicast communications being centralized in the control nodes.

According to one aspect of the invention, a method for providing multicast distribution in a network includes modeling a multicast group into a linearly chained topology having one or more chains of processor nodes in the multicast group, a control processor receiving a multicast packet, the control processor forwarding a version of the multicast packet to a first processor in each of the one or more chains. The method includes each of the first processors in the one or more chains forwarding the multicast packet to a subsequent processor in its respective chain and so on, until each processor in the one or more chains have received the multicast packet.

The method further comprises the control processor generating a data structure that is either pre-pended or appended to the replicated multicast packet. The data structure comprises a type-length-value structure and provides the "membership" of the processors that belong to the multicast address. The data structure can include any general format for representing data structures in a network system. The method includes monitoring the status of each of the plurality of processors in the one or more chains and rerouting the multicast packet around processors identified as being unhealthy.

The network includes one of an internet protocol network, an Ethernet network, or any point-to-point network. The method further includes the control process monitoring a processor membership in the multicast group. The processor membership in the multicast group is monitored using Internet group management protocol (IGMP). The processor membership in the multicast group can also be determined by the processors communicating directly with the control processor. The processors communicate an interest in the multicast membership in response to multicast add or remove operations by higher layer network protocols operating on the processor.

The data structure in the method further comprises a sequence number indicative of an ordering of multicast packets. The data structure also includes a deterministic ordering of processor identities which can be represented as a bitmap wherein each bit corresponds to one processor, or a linked list, or an array of processor identities. The data structure can include a bit-map wherein each bit corresponds to one processor or a linked list or an array of processor identities. The method includes the processors forwarding the multicast packet to a higher layer in the network architecture. The processors monitor the sequence number of a last packet that was passed to a higher layer in the network architecture. Each of the processors in the one or more chains inspect the data structure to determine the identity of the subsequent processor to receive the multicast packet. The processors may modify the data structure prior to forwarding the multicast packet to the subsequent processors. The processors may make a synchronous determination whether to forward the multicast packet to other processors and pass the packet up to the higher layer protocols. In the alternate, the processor can first pass the packet up its higher layer protocols and then determine if the packet should be forwarded to the other processor nodes, or vice versa. Embodiments can include the two operations, i.e., forwarding to subsequent processors and up to the higher layer, being performed in parallel where the processors have the ability to perform multiple parallel threads of operation. Further, the method includes at least two attempts being made at delivering the multicast packet to any processor identified as being unhealthy.

According to another aspect of the invention, a method for implementing multicast distribution in a computing platform having a plurality of processors includes defining a topology of an Ethernet network to be emulated on the computing platform. The topology includes at least one processor assigned to be at least one control node and a plurality of processors assigned to be processing nodes. The processing nodes form one or more chains of processing nodes. The method includes allocating virtual interfaces over an underlying physical network to provide direct software communication from each processing node to each other processing node in the one or more chains of processors. The method includes the control node receiving a multicast packet, the multicast packet having a multicast address identifying the multicast group of processing nodes. The control node then replicates the multicast packet, and communicates the multicast packet to a first processing node of the multicast group in the one or more chains of the processing nodes. The first processing node further communicating the multicast packet to a second processing node of the multicast group in the one or more chains, wherein the multicast packet is forwarded to all the processing nodes in the multicast group present in the one or more chains from one processing node to an adjacent processing node until all processing nodes of the multicast group have received the multicast packet. The underlying physical network is a point-to-point mesh connecting the plurality of processors.

The foregoing and other features and advantages of the invention will be apparent from the following more particular description of embodiments of the invention, as illustrated in the accompanying drawings.

DETAILED DESCRIPTION

The embodiments of the invention provide multicast communication using a distributed approach. Processing nodes assist in distributing multicast packets to other members of the multicast group.

Figure 1:
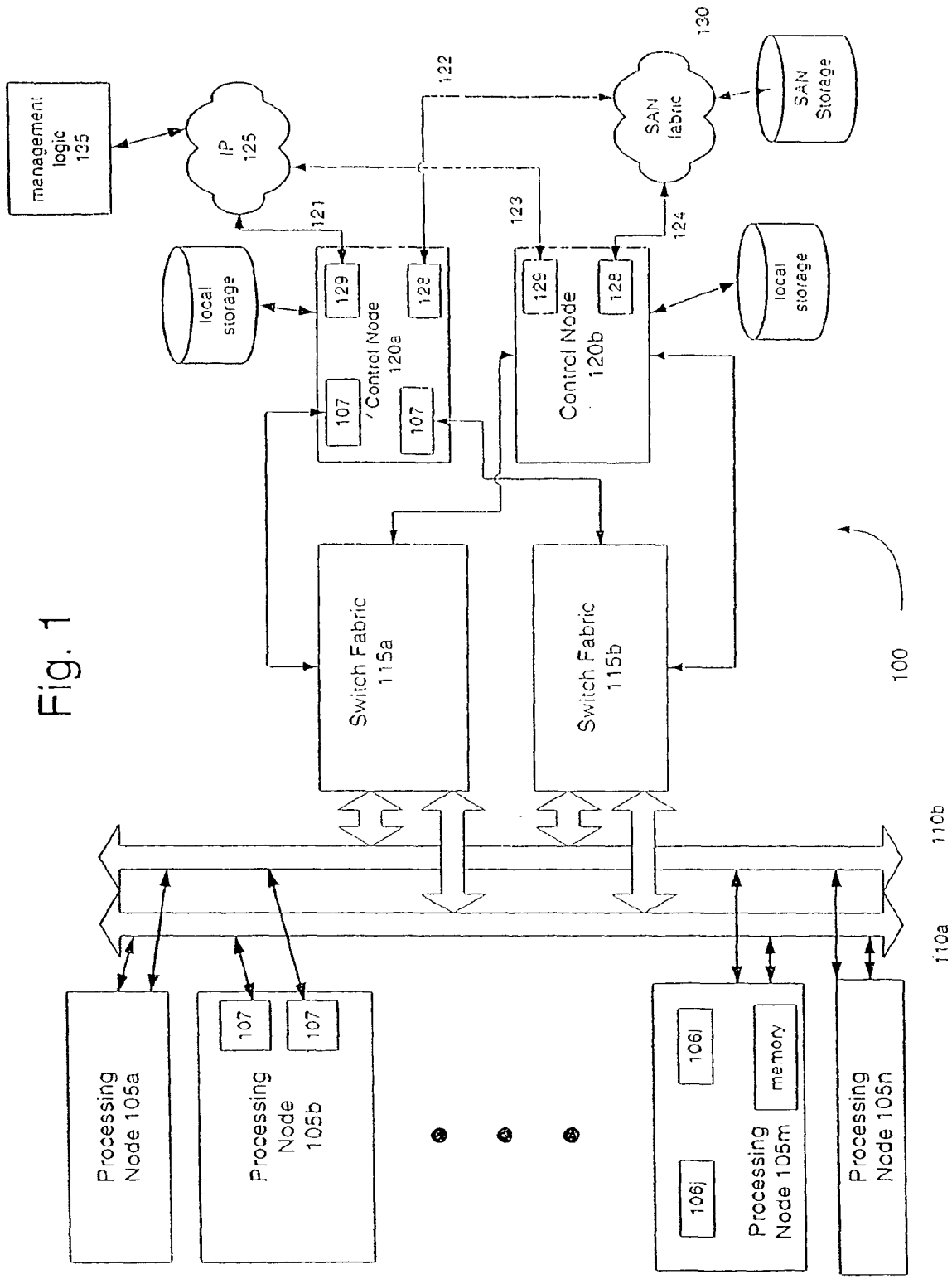
FIG. 1 is a system diagram illustrating one embodiment of the invention.
Figure 2A:
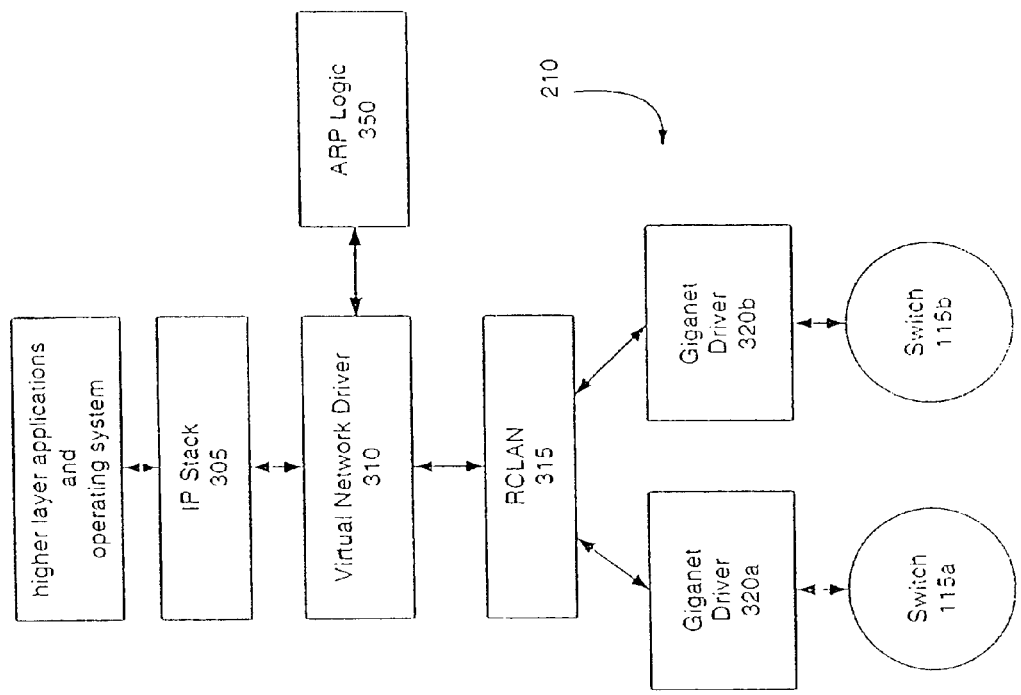
FIGS. 2A and 2B are diagrams illustrating the networking software architecture of certain embodiments of the invention.
Figure 2B:
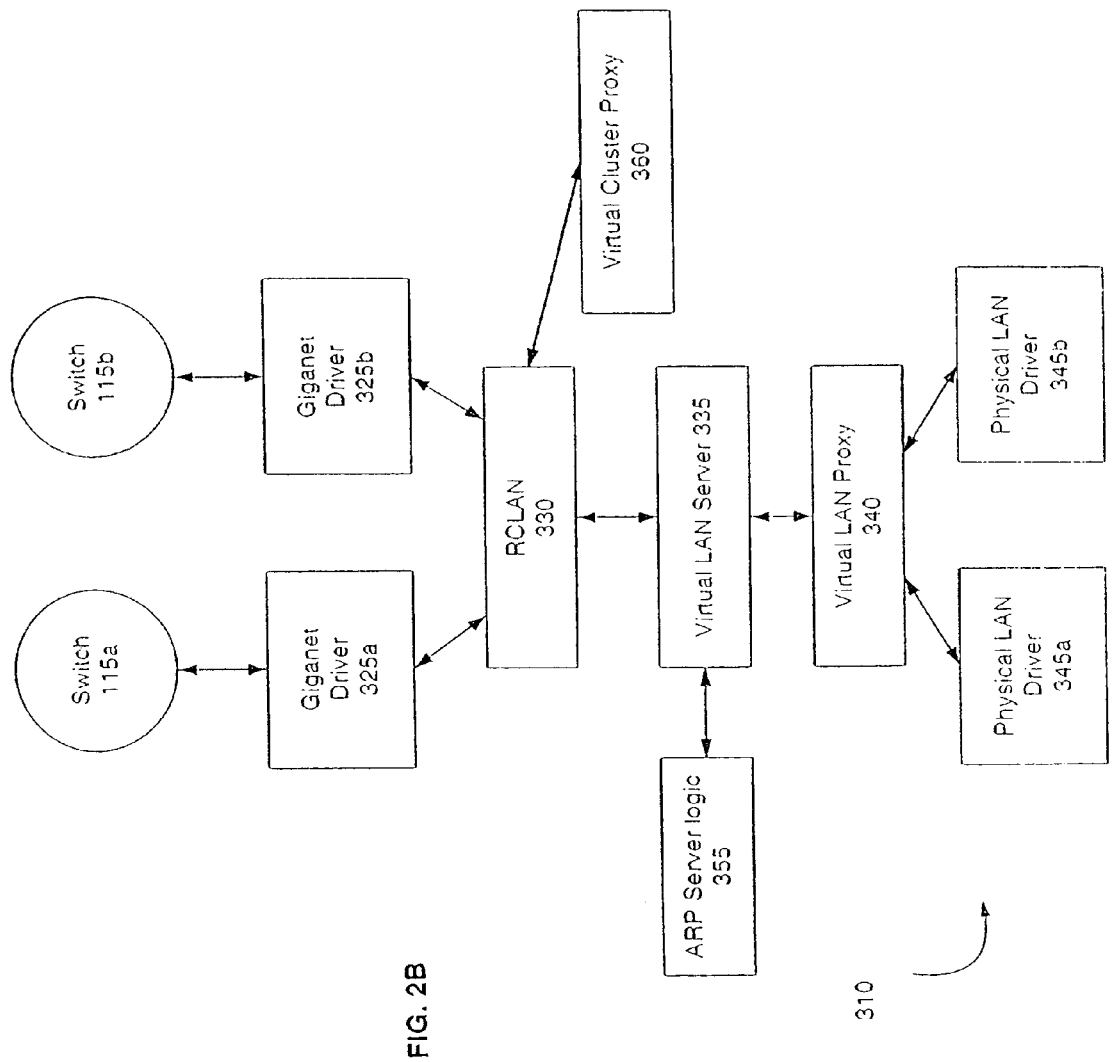
Figure 3:
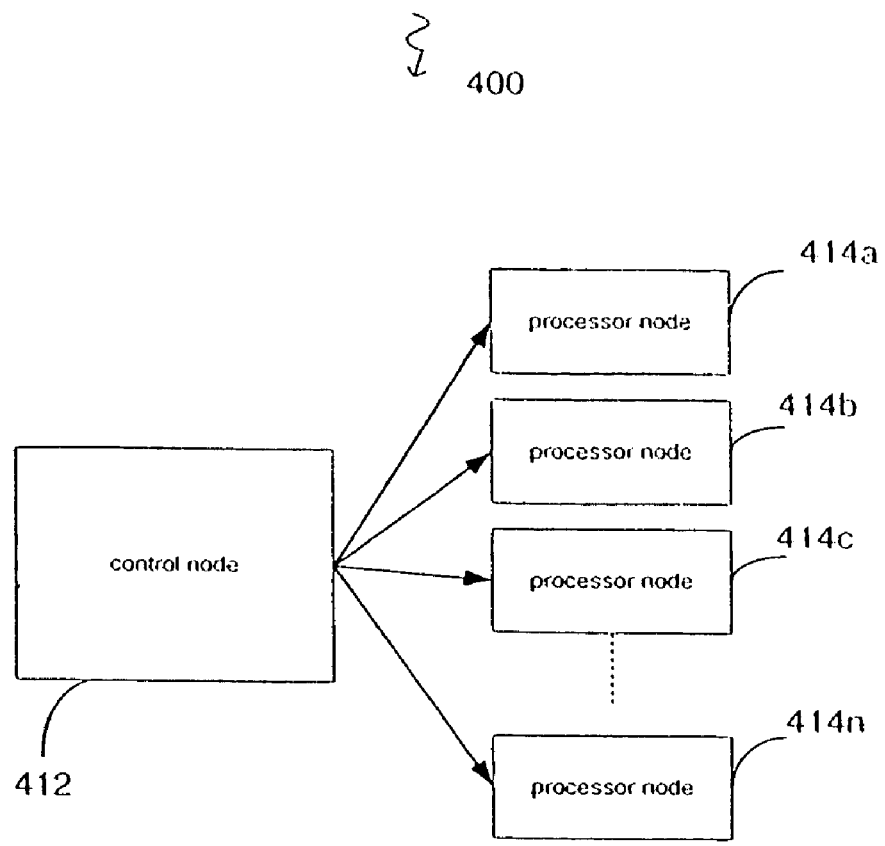
FIG. 3 illustrates a distribution mechanism for multicast packets that simulates multicast functionality.
Figure 4:
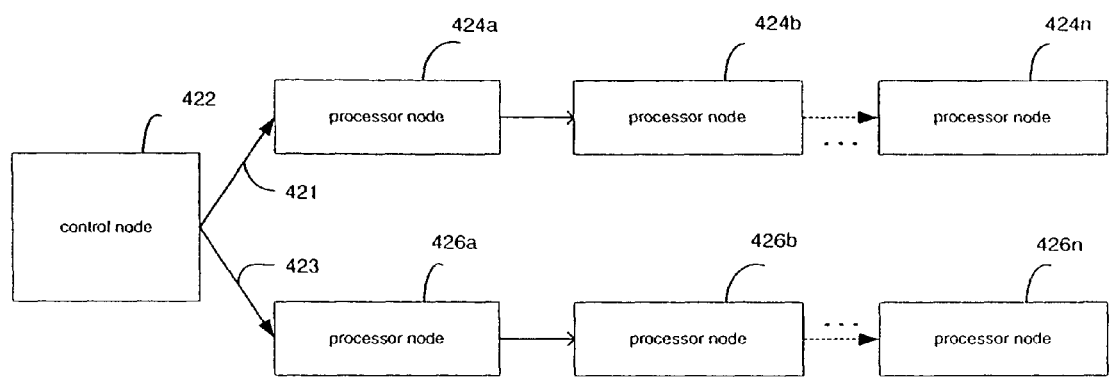
FIG. 4 illustrates a conceptual model of a distributed topology of processor nodes that provides multicast communication in a point-to-point architecture.

The multicast distribution methods of preferred embodiments use multicast distribution chain mechanisms. FIG. 4 illustrates a high-level model of the multicast distribution chains of certain embodiments. Multicast packets are delivered to the control node 422 but the control node 422 only sends the packet to the first processor node 424a, 426a on each of two multicast distribution chains 421, 423. These processor nodes 424a, 426a then each forward the packet to a respective subsequent processor node in the respective chain, for example, to the second processor nodes 424b, 426b, and so forth, until the multicast packet has been delivered to all necessary processor nodes in each chain.

Figure 5:
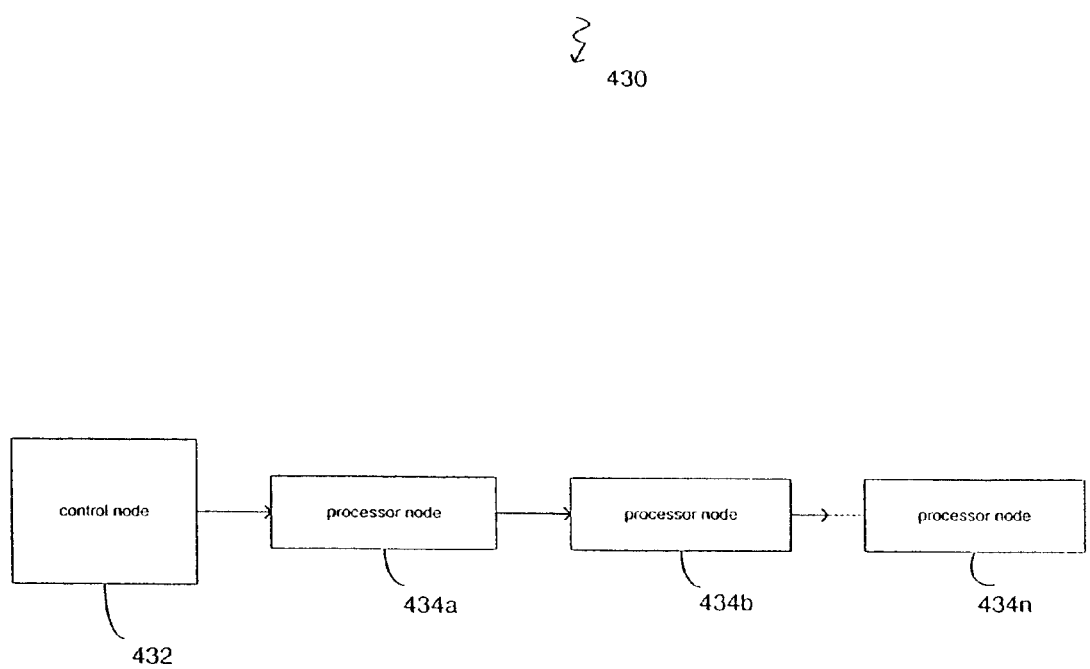
FIG. 5 illustrates a single linear chain topology that provides multicast functionality in a point-to-point architecture.

Even though, FIG. 4 illustrates two chains, any number of chains can be provided. For example, FIG. 5 illustrates an embodiment having a single linear chain topology 430 for multicast distribution. The multicast packets are delivered to the control node 432. The control node 432 only sends the packet to the first processor node 434a. This processor node 434a then forwards the packet to the second processor node 434b on the same chain, and so forth, until the multicast packet has been delivered to all subsequent processor nodes 434n on the chain who are members of the multicast group. As described before, this single linear chain topology can be replicated to include any number (n) of chains.

The control node uses the same multicast group membership mechanism as described before in connection with the BladeFrame architecture, i.e., IGMP snooping of Layer 2 function. This information is used to create data structures to create software-expressed models for distributed multicast communication. In a preferred embodiment, the model is a plurality of chains in communication with a control node.

The control node logic determines the distributed multicast topology. The processing nodes register with the control node, which then configures the distributed model following a predetermined configuration provided to the control node logic as part of the initial set up at boot up. For example, the processing nodes are divided into n chains by the order in which the control nodes detected the processing node as joining a given multicast group. For example, for a two-chain configuration, with the following processing nodes joining a multicast group in the following sequence: p3, p1, p6, p5, p2, p4, the 2 chains will be divided up as:

Chain 1: p3, p6, p2
Chain 2: p1, p5, p4

In certain embodiments (e.g., Bladeframe-like embodiments), the control node will receive the multicast packet from an internal processor node or an external network as described previously, replicate the packet and forward it to the first processors in the two chains, for example, p3 and p1. The multicast packet replicated by the control node also includes multicast group membership information which is provided to the processing nodes which then forward the multicast packet to the multicast members on their respective chain.

In an alternate embodiment, the multicast distributed topology model including a certain specific number of linear chains or other topologies may be determined after boot up and be programmable by an administrator.

All multicast packets have one or more pre-pended or appended data structures. This data structure is processed by the virtual physical layer of the architecture's virtual network and is removed from the packet before it is sent up the network stack (IP stack) on a processor node, or before the packet is transmitted externally from the platform. One data structure used in an embodiment is a TLV data structure. All packets are allowed any number of TLVs. In an embodiment, less than a threshold number of bytes, for example, about 80 bytes of TLVs are used. Different data structures used in computer network systems can be used instead of a TLV data structure.

In an embodiment, the fields in the multicast data structure can include a TLV length, a multicast address, the identification of the control node and a map as described in Table 1.

TABLE 1

| Field | Usage |
|---|---|
| TLV length | Multicast type and length of the multicast TLV structure |
| Multicast address | The multicast address For example, multicast address 224.0.0.5 would be Represented as hexadecimal value 050000E0 |
| Control node id | Contains an identifier for the Control node, e.g., Control node A or Control node B |
| Map | A bit mask of the processing nodes in the multicast group. Bit 1 in this mask = processing node 1 is in this multicast group Bit 2 in this mask = processing node 2 is in this multicast group . . . Bit p in this mask = processing node p is in this multicast group |
| Sequence Number | Monitonically increasing sequence number maintained by the control node. This sequence number allows the processing nodes to detect ordered, non-duplicate packets. |

An example of usage of the "Map" field, for p3, p6, p2 in a given chain includes the initial map from the control node:

| Bit | 6 | 5 | 4 | 3 | 2 | 1 | 0 |
|---|---|---|---|---|---|---|---|
| Value | 1 | 0 | 0 | 1 | 1 | 0 | 0 |

Continuing with the above example, the control node will send the multicast packet to the first processing node in the map, which is p2. Processing node, p2 receives the multicast packets. Processing node p2 then clears its corresponding bit in the map (bit 2 changes from 1 to 0) to indicate that processing node p2 has processed this multicast packet. The processing node p2 then propagates the multicast packet to the next processing node with a bit set in the map (specifically processing node p3 in the above example) in the ascending direction. The map for processing node p2 will be:

| Bit | 6 | 5 | 4 | 3 | 2 | 1 | 0 |
|---|---|---|---|---|---|---|---|
| Value | 1 | 0 | 0 | 1 | 0 | 0 | 0 |

If processing node p3 is "bad" or unhealthy (more below), processing node p2 will skip processing node p3 (leaving bit 3 set) and a requeue mechanism (described below in detail) will propagate the multicast packet to the next processing node with a bit set in the map (specifically in this example, processing node p6) in the ascending direction.

Processing node p6 receives the multicast packet, and clears its own bit in the map (bit 6) and sees that there are no more bits set in the map in the ascending direction. Processing node p6 then propagates the multicast packet to the next processing node with a bit set in the map in the descending direction (processing node p3). The map from processing node p6 will be:

| Bit | 6 | 5 | 4 | 3 | 2 | 1 | 0 |
|---|---|---|---|---|---|---|---|
| Value | 0 | 0 | 0 | 1 | 0 | 0 | 0 |

If processing node p3 is now determined to be "good" or healthy, processing node p3 clears its corresponding bit in the map (bit 3) to indicate that the processing node p3 has processed this multicast packet. Since no more bits are set in the map, processing node p3 is at the end of the distribution chain.

Figure 6:
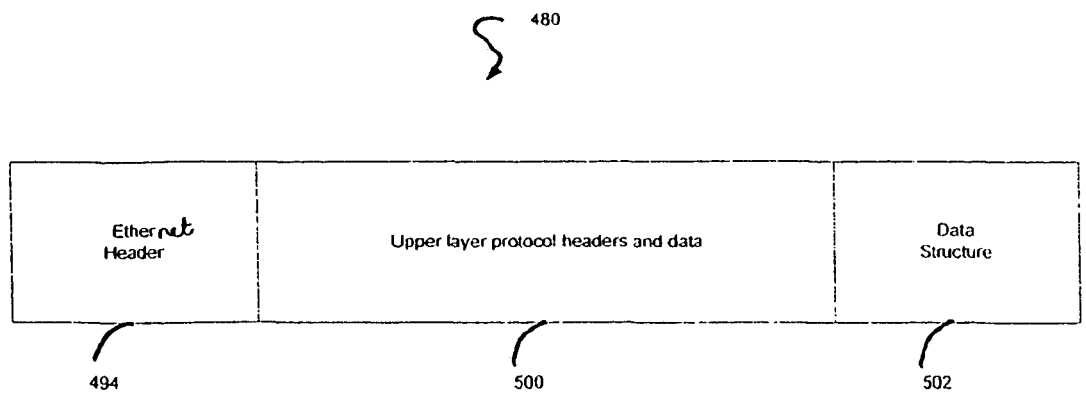
FIG. 6 illustrates a distribution multicast packet format on a virtual switch.

FIG. 6 illustrates a simplified distribution multicast packet format 480 on the virtual switch. The Ethernet packet contains the Ethernet header 494 and the upper layer protocol headers and data 500. The distributed multicast packet includes an extra data structure 502. In an embodiment this data structure 502 is the multicast TLV structure. The fields of the multicast TLV data structure include the TLV length, multicast address, control node identification, map, and sequence number as described before.

Figure 7:
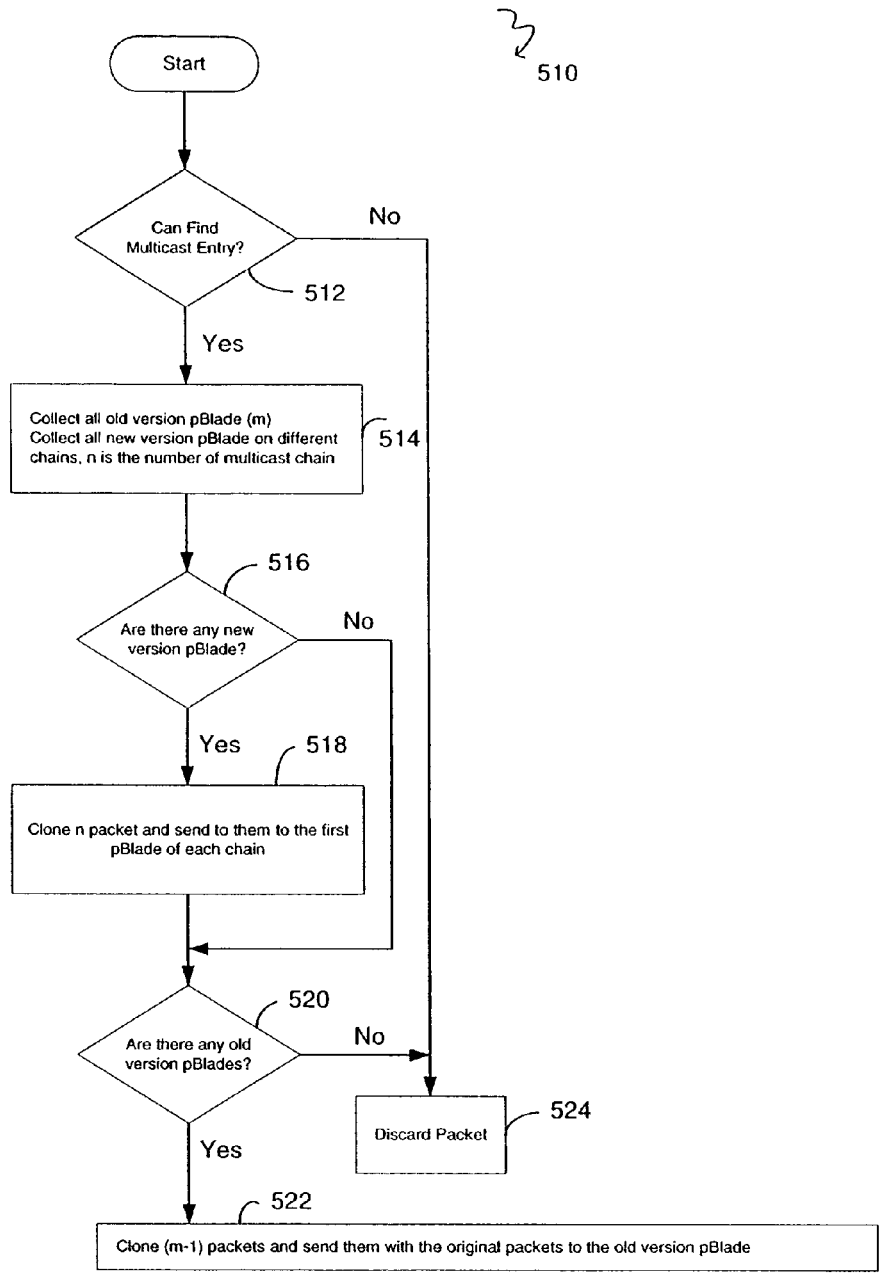
FIG. 7 is a flow chart showing a multicast packet processing logic used by the control nodes.

FIG. 7 is a flow chart 510 showing a multicast packet processing logic used by the control node. The multicast distribution logic in the virtual LAN server determines if the multicast packets are sent from an internal processor node or from an external network.

The flow diagram 510 includes determining if the multicast group address can be found per step 512. If the multicast group can be found, it is then accounted for or collected per step 514. If no multicast packet recipient can be determined, the packet is discarded per step 524. The logic determines which processor nodes in the group have logic for distributing multicast packets and which do not (for backward compatibility). For the latter processor nodes, the logic uses the approach previously described in the background section. For the former, the logic employs a distributed approach.

The multicast system allows control nodes to keep track of the versions of processor node virtual Ethernet drivers. The ping status message exchanged between virtual Ethernet drivers and control nodes is enhanced to include virtual Ethernet version information. Control nodes monitor this information to determine which processor nodes should be included in the new distribution mechanism. The multicast distribution logic in the server includes a function associated with a multicast packet sent from an internal processor node and a function associated with a multicast packet sent from external networking.

After step 514, it is determined if there are any processing nodes in the system that are configured per the distributed topology per step 516. Step 516 is an optional step which is not used if the platform architecture has only one particular version of multicast distribution. If the logic determines that some processing nodes are to be handled with distributed multicast functionality, then the multicast packet is replicated for the "n" number of chains in the topology and is sent to the first processing node of each of the n chains per step 518. Steps 520 and 522 address the replication and transmission of the multicast packet for the configuration described in the background section.

Figure 8:
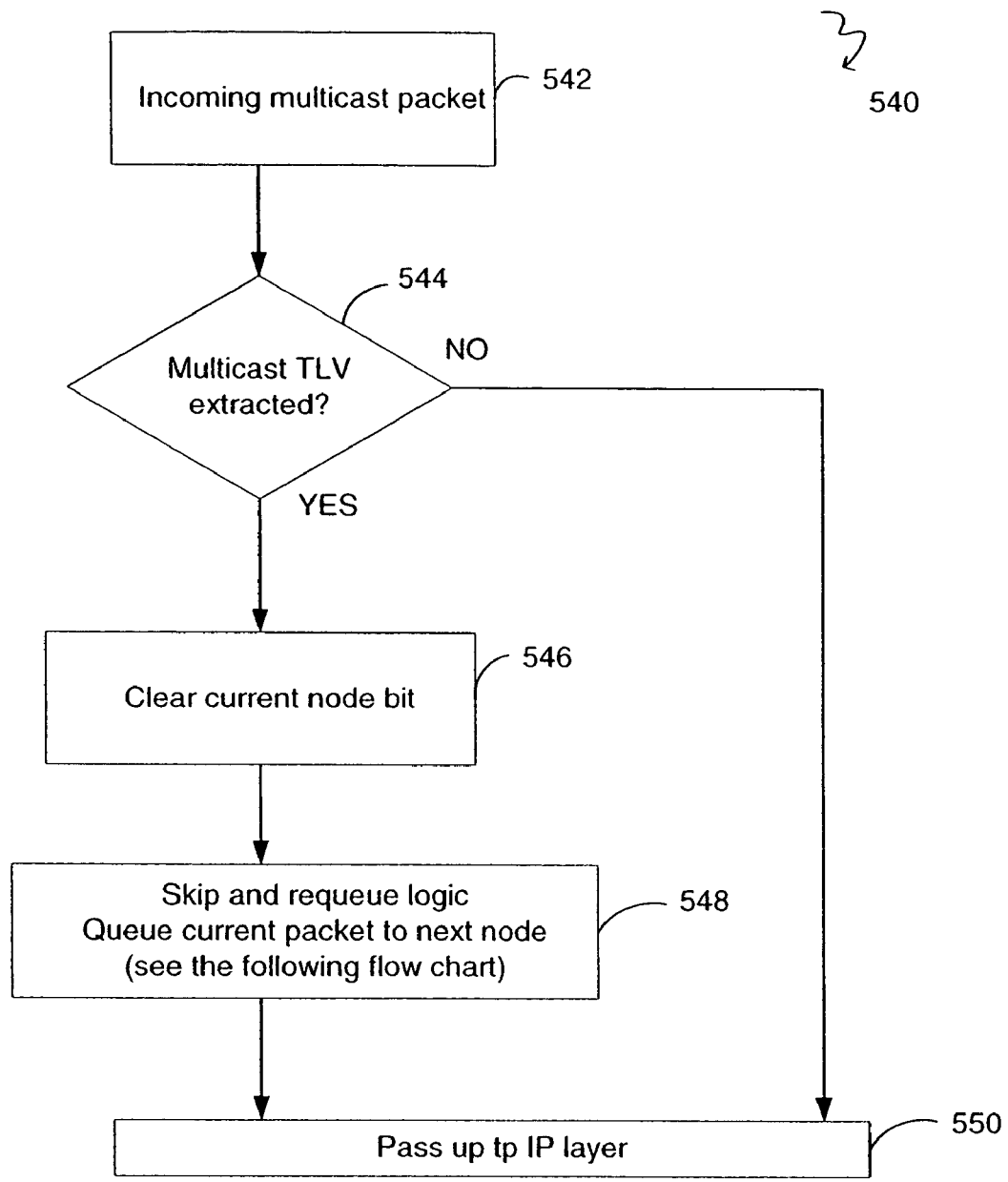
FIG. 8 is a flow chart showing a multicast packet processing logic used by the processor nodes.

FIG. 8 is a flow chart 540 showing the processor node logic for handling the distribution of a multicast packet. This logic is used for processing multicast packets in the processing nodes for distributed multicast. In Bladeframe-like embodiments this logic is implemented in the executable instructions of the virtual Ethernet receive packet logic. The fault resilient method 540 includes receiving an incoming multicast packet in step 542. Per step 544, the processing node determines if there is present a multicast TLV data structure to extract from the packet header. If not, the packet is directly passed to the IP layer of the network stack of that node in step 550. If, however, there is a multicast TLV data structure to extract, then the current node bit is cleared from the bitmap in step 546. The skip and requeue logic is used to decide the next node to propagate the multicast packet to which is described with respect to FIG. 9.

In order to limit packet loss in cases where a processor node is down or is otherwise compromised (loaded) and can not effectively participate in the distribution chain, an intermediate upstream processor node makes a decision to skip the next down-stream processor node. This decision is based on the downstream processor node's node status, and the downstream processor node's virtual Ethernet virtual interface transmitting queue depth. The skip logic and implementation details are described below with respect to the description of the faults resilience.

When the "sending" processor node skips to the next alive or healthy downstream processor node, the sending processor node first dequeues from the skipped processor node's virtual interface transmitting queue if this skipped processor node's virtual interface queue is not empty, then the sending processor node enqueues packets into the next healthy downstream processor node to minimize packet loss.

Returning to FIG. 8, the multicast packet is cloned or replicated in step 548 and sent to the next healthy processor node. This invention also provides for optimization that allows a processing node to minimize and preferably prevent packet mis-order and duplication. In an embodiment, the processing node examines the sequence number (described in Table 1) in this multicast packet. If the sequence number is less than or equal to the last observed sequence number from this control node, then this multicast packet is mis-ordered or duplicated so the packet will not be sent up to the processor node's higher layer protocols. Otherwise, the processing node will record the sequence number in this multicast packet as the last observed sequence number from this control node. Then, the multicast packet is sent up the higher layer protocols per step 550. Without this optimization, the multicast packet maybe sent up the higher layer protocols per step 550 more than once.

Figure 9:
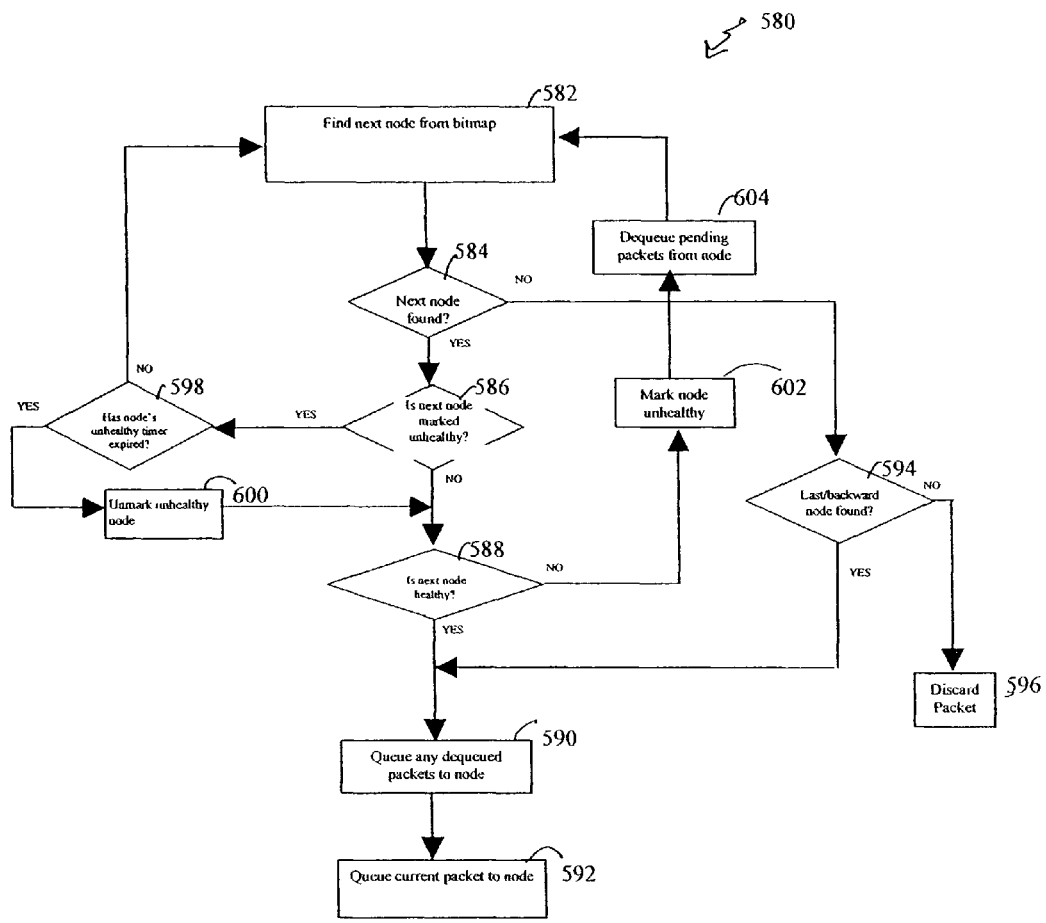
FIG. 9 illustrates a flow diagram of skip logic and requeue mechanism used by the control nodes and processor nodes.

In the distributed multicast topology, the logic of FIG. 9 is implemented. Each bit in the map corresponds to a location identifier in the network architecture, for example, the slot numbers associated with the processor servers or nodes (pservers) which in an embodiment are 24 in number. As described before, with respect to the fields of the multicast TLV data structure (Table 1) the first bit or position is associated with the first processor server. The positions indicate which server will receive the multicast packet.

Packet propagation to the next processor node is provided in collapsed LAN (CLAN) interrupt context, and the priority of this process is higher than other kernel processes and application processes. Therefore, if the processor node is under extremely heavy load, the packets may be dropped on the IP stack because of burst, but the packets will still be propagated in the chain to the following processor node.

Faults Resilience

Since processor nodes are used in the distribution of multicast packets, the failure of any processor node in the distribution chain preferably is communicated to the control node and the next upstream processor node as quickly as possible to minimize dropping multicast packets.

The following two mechanisms are used to address the graceful shut down, power off, crash or lock up of an intermediate processor node. The first method is an IGMP leave message method. When the intermediate processor node in the multicast chain is gracefully shut down, the virtual Ethernet device is unregistered, and the IGMP leave message is sent out to the virtual switch to inform the virtual switch that this processor node is not interested in the multicast group any more. Once the IGMP leave message is snooped by the virtual Switch, the port member is removed from the multicast table. The control node then reprograms the multicast chains and the multicast packet is continuously delivered to all remaining processor nodes.

The second mechanism includes a skip logic and requeue multicast packet method. The skip logic depends in part on two flags, namely the downstream processor node virtual interface queue depth and the processor node node status. If either of these two flags of a particular processor node is set, they cause the particular processor node to be skipped. In either case, if the downstream processing node virtual interface queue is not empty, the requeue mechanism is triggered.

The processor node node status flag is initialized as 0. When the processor node node down is detected through the node down interrupt handler, the processor node status flags will be set. Once the node up interrupt is detected, this flag is reset to 0.

With respect to the downstream processor node virtual interface queue depth, the maximum processor node virtual interface transmitting queue depth in an embodiment is 192. When the queue length is larger than 128, downstream processor node virtual interface queue depth flag will be set. Once the next multicast packet detects the processor node's transmission queue is available, the downstream processor node virtual interface queue depth flag is reset.

In order to limit packet loss, the skipped processor node is placed at the end of the chain. In this location the skipped processor node does not affect downstream processor nodes. At most, the skipped processor node in the last location of the chain only affects other busy processor nodes.

Four rules are used to define the logic or sequence of instructions for fault resilience: the transmission rule, the requeue rule, the skip rule and the skip recover rule.

Per the transmission rule, the multicast packet begins to transmit from the lowest number of processor node. The processor node first propagates the multicast packet to a larger number processor node in the chain. If there is no larger number processor node in the same multicast chain, the processor node then propagates the packets to a smaller number processor node (these processor nodes normally are busy processor nodes and are skipped).

The requeue rule defines requeue as only occurring from the smaller number of a processor node to the larger number of a processor node.

Per the skip rule, when the requeue occurs, the dequeue processor node is marked with a flag which indicates that this is a busy or unhealthy processor node. The dequeue time is recorded. During the next 5 seconds, for example, the multicast packet skips this processor node and this processor node receives the multicast packet through the last not busy processor node.

Per the skip recover rule, after a dequeue time interval (for example, 5 sec) has expired, the downstream processor node virtual interface queue depth is checked. If the downstream processor node virtual interface queue depth is empty, then the unhealthy flag is reset and this downstream processor node is inserted into the middle of the multicast chain.

When the processor node is quite burst, the dequeue frequency is measured during this period of time. If the dequeue frequency is larger than, for example, 2 times/second, the processor node is skipped without checking if the dequeue time interval has expired or not.

The skip logic and requeue mechanism is described in the following example: When the multicast packet is distributed from processors, for example, p2--->p3--->p4->p6, if processor p2 detects that there is a $128^{th}$ packet in processor p3's transmitting queue, processor p3's downstream processor node virtual interface queue flag will be set. When the $129^{th}$ packet arrives at processor p2, processor p2 checks if processor p3's downstream processor node virtual interface queue has been set, then processor p2 will look for the next healthy/alive processor node in the multicast chain, and processor p4, for example, is found. Before transmitting the $129^{th}$ packet down to processor p4, processor p2 will dequeue 127 packets from processor p3 (leaving one packet in the queue for later detection use), and enqueue these $127^{th}$ packets to processor p4's transmitting queue, and set processor p4's requeue flag to allow processor p4 transmitting queue to be temporarily larger than the maximum queue length 192. Further, processor p3's unhealthy flag is set and dequeue time is recorded.

When the $130^{th}$ packet arrives at processor p2, processor p2 will skip processor p3 because the unhealthy flag is set. Then the packet will be propagated from processor p2 to processor p4 to processor p6. When the packet arrives on processor p6, if processor p6 can not find any larger processor node in the multicast chain, it will then search backwards. When processor p6 finds processor p3 still in the multicast chain, the packets will be sent to processor p3.

In the next 5 seconds, processor p3 will be at the end of the multicast chain. After 5 seconds, processor p2 will detect that processor p3 is alive or not by detecting if processor p3's last left packet has been sent out or not. If the packet has not been transferred out, processor p3 will still be skipped and be located at the end of the chain, otherwise, processor p3 will be put back to the middle of the chain, and processor p2 will choose processor p3 as the downstream processor node in the multicast distribution chain.

When the multicast traffic is not heavy, the processor node node down interrupt will be detected first when the processor node is powered down or the processor node crashed. In a heavy multicast traffic situation, the processor node queue depth is full because the collapsed LAN (CLAN) cannot transfer any packet when the processor node has failed. This is a faster way to detect a failure than the node status check method.

FIG. 9 is a flow diagram illustrating the logic 580 associated with a control node and processor nodes that identifies the next node to which the multicast packet is propagated. The control or processor node starts to look for the next processor node identified in the multicast bitmap (step 582). The control or processor node, per step 584, then determines if it has located the next processor node identified in the bitmap. If it has, it determines if the "unhealthy flag" has been previously identified, in step 586. If it is not, i.e., the next node was determined previously to be healthy per step 588, it determines if this next identified processor node is currently healthy or not. If this processor is healthy, any dequeued packets are first enqueued to the next processor node (step 590), and the current multicast packet is then sent to it (step 592).

In the method 580, if per step 584, the identified next processor is not located, then the process proceeds to the logic identified in step 594. Per step 594, if the last or backward processor node has been found, then any dequeued packets are first enqueued to this processor node (step 590), and the current multicast packet is then sent to it (step 592). If it is determined that the last or backward node has not been found, then per step 596, the current packet is discarded.

The method 580 also includes step 598 of determining if the time expired to check a processor node's health is enough once it is determined that the processor node was previously marked as unhealthy in step 586. If the time expired is determined to not be adequate, the method 580 iterates back to step 582. However, if the time expired is determined to be adequate, then the unhealthy flag is unmarked per step 600 and the process reenters the evaluation of the health of the processor in step 588.

The method 580 includes the provision of step 602 if the next identified processor was determined to be unhealthy. Per step 602, it marks this processor node with an unhealthy flag and dequeues any pending packets from this node in step 604. Then the process iterates back through step 582.

An alternate architecture includes a processor node binary/tertiary/n-ary tree multicast distribution topology. Distributing multicast packets in some form of a tree structure includes a control node sending a packet to one or several processor nodes, each processor node then sending the packet to one or several other processor nodes, and so on. The processor nodes have to do the work of receiving a packet, pushing the packet up its TCP/IP stack, and transmitting the packet to more than one other processor node.

Figure 10:
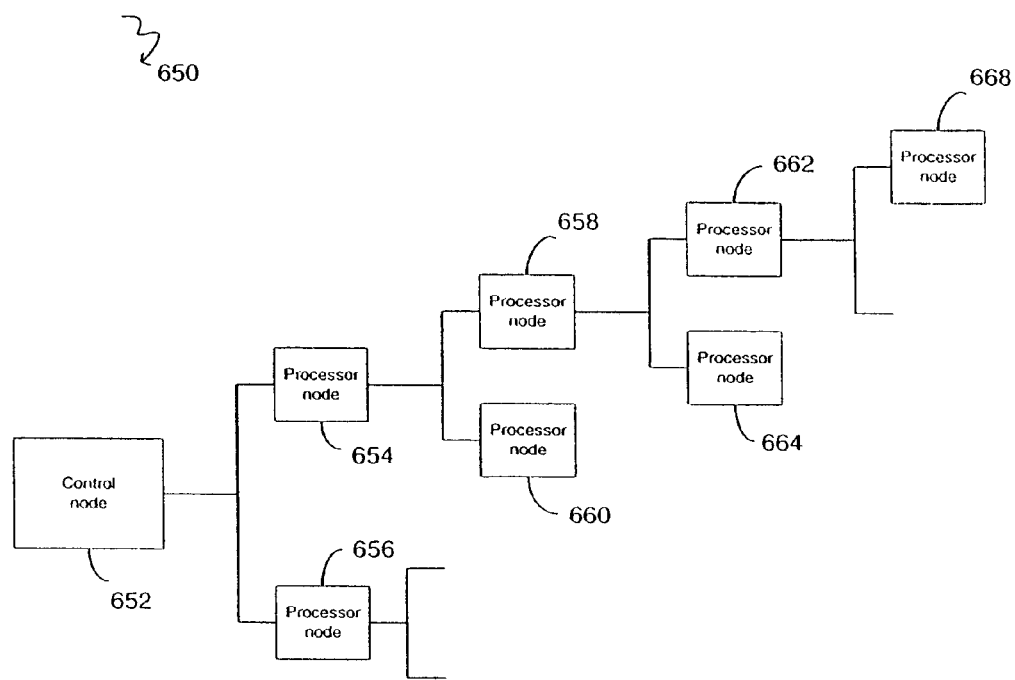
FIG. 10 illustrates a binary tree which is an alternate multicast distribution topology for a point-to-point architecture.

FIG. 10 illustrates a binary tree topology 650 which is an alternate multicast distribution architecture for a point-to-point mesh. In this binary tree the group members or processor nodes 654, 656, 658, 660, 662, 664, and 668 are arranged at the position of leaves. The control node 652 distributes the multicast packet to the processor nodes. As illustrated, the topology is a binary tree. In this embodiment, each processor node distributes the multicast packet to two downstream processor nodes.

Latency

One side affect of the multicast distribution chain mechanism is that multicast latency can vary from processor node to processor node based on the processor node's location in the chain. However, the latencies of the topology described herein and fan out topology are in the same order of magnitude. It should be noted that high latencies in broadcast-style communication mechanism are common-place and do not affect bandwidth packet per second ((pps)).

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the diagrams. While various elements of the preferred embodiments have been described as being implemented in software, other embodiments in hardware or firmware implementations may alternatively be used, and vice-versa.

It will be apparent to those of ordinary skill in the art that methods involved in the Distributed Multicast System and Method in a Network may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

Other aspects, modifications, and embodiments are within the scope of the following claims.

What is claimed is:

1. A method for providing multicast distribution in a network, the method comprising:
    modeling a multicast group, the multicast group identifying a set of processor nodes that are to receive a multicast data packet, into a linearly chained point to point topology having at least one chain, each chain including a plurality of processor nodes in the multicast group;
    receiving a multicast data packet at a control processor;
    forwarding a version of the multicast data packet from the control processor to a first processor node in each of the at least one chain;
    appending a data structure comprising multicast group membership information identifying each processor node in the modeled multicast group;
    to the multicast data packet;
    forwarding the multicast data packet from the first processor node in each of the at least one chain to a subsequent processor node in its respective chain based on the point to point topology using a unicast address;
    wherein the first processing node modifies the data structure in the multicast data packet to change the multicast group membership information contained therein to indicate that the first processing node has received the multicast data packet, wherein the first processing node forwards the multicast data packet with the modified data structure to a subsequent processing node, and wherein the data structure further comprises a sequence number indicative of an ordering of the multicast data packets;
    wherein the subsequent processor node modifies the data structure in the multicast data packet to change the multicast group membership information contained therein to indicate that the subsequent processor node has received the multicast data packet, and wherein the subsequent processor node forwards the multicast data packet with the modified data structure to another subsequent processor node;
    wherein the process of forwarding the multicast data packet and modifying the data structure therein is repeated until each processor node identified in the multicast group, in each of the at least one chain, has received the multicast data packet by such forwarding; and
    wherein the processor nodes communicate an interest in a multicast membership in response to multicast add or remove operations by higher layer network protocols operating on the processor node.

2. The method of claim 1, wherein the data structure comprises a type-length-value structure.

3. The method of claim 1, wherein the data structure comprises a plurality of data structures used in different network systems.

4. The method of claim 1, wherein the data structure comprises a multicast address identifying the multicast group of processor nodes.

5. The method of claim 1, further comprising:
    monitoring the status of each of the plurality of processor nodes in each of the at least one chain; and
    rerouting the multicast data packet around processor nodes identified as being unhealthy.

6. The method of claim 1, wherein the network comprises a point-to point virtual interface modeled switched fabric.

7. The method of claim 1, wherein the network comprises an internet protocol network.

8. The method of claim 1, wherein the network is a Processor Area Network (PAN).

9. The method of claim 1, wherein the network is a point-to-point network.

10. The method of claim 1, wherein the control processor monitors a processor membership in the multicast group.

11. The method of claim 10, wherein processor membership in the multicast group is monitored using Internet group management protocol (IGMP).

12. The method of claim 10, wherein processor membership in the multicast group is determined by the processor nodes communicating directly with the control processor.

13. The method of claim 1, wherein the data structure further comprises a deterministic ordering of processor node identities.

14. The method of claim 13, wherein the data structure comprises a bit-map wherein each bit corresponds to one processor node.

15. The method of claim 13, wherein the data structure comprises one of an indexed array of processor identifiers, and a linked list.

16. The method of claim 1, wherein the first processor node forwards the multicast data packet to a higher layer in the network architecture.

17. The method of claim 1, wherein the first processor node monitors the sequence number of a last multicast packet that was passed to a higher layer in the network architecture.

18. The method of claim 5, wherein at least two attempts are made at delivering the multicast data packet to any processor node identified as being unhealthy.

19. The method of claim 1, wherein each of the processor nodes in the at least one chain inspect the data structure to determine the identity of the subsequent processor node to receive the multicast data packet.

20. A method for implementing multicast distribution in a network having a plurality of processors, the method comprising:
defining a topology of an Ethernet network to be emulated on a computing platform, the topology including at least one processor assigned to be at least one control node and a plurality of processors assigned to be processing nodes, the processing nodes forming at least one point to point chain of processing nodes;
allocating virtual interfaces over an underlying physical network to provide direct software communication from each processing node to each other processing node in the at least one chain of processing nodes;
the at least one control node receiving a multicast data packet, said multicast data packet having a data structure that is appended to the multicast data packet, the data structure having (i) a multicast address identifying the multicast group of processing nodes and (ii) multicast group membership information identifying a set of processor nodes that are to receive a multicast data packet, the at least one control node communicating the multicast data packet to a first processing node of the multicast group in the at least one chain or processing nodes; and
the first processing node communicating the multicast data packet to a subsequent processing node of the multicast group in the one ore more chains via a point to point unicast over the virtual interface,
wherein the first processing node modifies the data structure in the multicast data packet to change the multicast group membership information contained therein to indicate that the first processing node has received the multicast data packet, wherein the first processing node forwards the multicast data packet with the modified data structure to a subsequent processing node, and wherein the data structure further comprises a sequence number indicative of an ordering of the multicast data packets;
wherein the multicast data packet is forwarded from the subsequent processing node to an adjacent processing node based on the multicast group membership information included in the data structure, and
wherein each of the subsequent processing nodes modifies the data structure in the multicast data packet to change the multicast group membership information contained therein to indicate that the subsequent processing node has received the multicast data packet, and
wherein the subsequent processing node forwards the multicast data packet with the modified data structure to a another subsequent processing node, wherein the process of forwarding the multicast data packet and modifying the data structure therein is repeated until each processing node identified in the multicast group in the at least one chain has received the multicast data packet; and
wherein the processing nodes communicate an interest in a multicast membership in response to multicast add or remove operations by higher layer network protocols operating on the processing nodes.

21. The method of claim 20, wherein the underlying physical network is a point-to-point mesh Processor Area Network (PAN) connecting the plurality of processing nodes.

22. The method of claim 20, further comprising a plurality of chains of processing nodes, wherein the at least one control node forwards the multicast data packet to the first processing node of the multicast group in the plurality of chains.

23. The method of claim 20, wherein the data structure comprises a type-length-value structure.

24. The method of claim 20, further comprising monitoring a health status of each processing node and communicating a failure of any processing node to the at least one control node and the previous processing node in the at least one chain.

25. The method of claim 20, wherein the network comprises an internet protocol network.

26. The method of claim 20, wherein the network is an Ethernet network.

27. The method of claim 20, wherein the network is a point-to-point Processor Area Network (PAN) network.

28. The method of claim 20, wherein the at least one control node monitors a processor membership in the multicast group.

29. The method of claim 28, wherein processor membership in the multicast group is monitored using Internet group management protocol (IGMP).

30. The method of claim 28, wherein processor membership in the multicast group is determined by the processors communicating directly with the at least one control node.

31. The method of claim 20, wherein the data structure comprises a bit-map wherein each bit corresponds to one processor.

32. The method of claim 20, wherein the processing nodes forward the multicast data packet to a higher layer in the network architecture.

33. The method of claim 20, wherein the processing nodes monitor the sequence number of a last packet that was passed to a higher layer in the network architecture.

34. The method of claim 24, wherein at least two attempts are made at delivering the multicast data packet to any processor identified as being unhealthy.

35. The method of claim 20, wherein each of the processing nodes in the at least one chain inspect the data structure to determine the identity of the subsequent processing nodes to receive the multicast data packet.

36. The method of claim 1, wherein the linearly chained topology having at least one chain of processor nodes comprises a plurality of linear chains of processor nodes.

37. The method of claim 1, wherein the process of forwarding the multicast data packet from one of the plurality of processor node to another different one of plurality of processor node occurs at OSI data link layer 2.

38. The method of claim 1, wherein the control processor forwards the multicast data packet only to the first processor node in each of the at least one chain.

39. The method of claim 1, wherein appending the data structure comprises one of:
 prepending the data structure to the beginning of the multicast data packet; and
 appending the data structure to the end of the multicast data packet.

* * * * *